(12) United States Patent
Liou et al.

(10) Patent No.: US 8,587,862 B2
(45) Date of Patent: Nov. 19, 2013

(54) SECOND-HARMONIC GENERATION NONLINER FRENQUENCY CONVERTER

(75) Inventors: Jiun-Wei Liou, Pingtung County (TW);
Jun-Ying Li, New Taipei (TW);
Chih-Ming Lai, New Taipei (TW);
Chern-Lin Chen, Taipei (TW);
Way-Seen Wang, Taipei (TW);
Lung-Han Peng, Taipei (TW)

(73) Assignee: Arima Lasers Corp., Taoyuan County (TW)

( * ) Notice: Subject to any disclaimer, the term of this patent is extended or adjusted under 35 U.S.C. 154(b) by 235 days.

(21) Appl. No.: 13/218,462

(22) Filed: Aug. 26, 2011

(65) Prior Publication Data
US 2012/0194900 A1    Aug. 2, 2012

(30) Foreign Application Priority Data
Feb. 1, 2011    (TW) .............................. 100103915 A

(51) Int. Cl.
*G02F 1/37*    (2006.01)
*G02F 1/35*    (2006.01)

(52) U.S. Cl.
USPC ........................................... 359/328; 372/22

(58) Field of Classification Search
USPC ................ 359/326–332; 372/21–22; 385/122
See application file for complete search history.

(56) References Cited

U.S. PATENT DOCUMENTS

| 5,768,302 | A | * | 6/1998 | Wallace et al. ................. 372/21 |
| 6,726,763 | B2 | * | 4/2004 | Lee et al. .......................... 117/2 |
| 7,492,507 | B1 | * | 2/2009 | Gollier ........................... 359/326 |
| 8,173,982 | B2 | * | 5/2012 | Edamatsu et al. ......... 250/493.1 |
| 2007/0121685 | A1 | * | 5/2007 | Maekawa ........................ 372/21 |
| 2011/0038034 | A1 | | 2/2011 | Kashyap et al. |

FOREIGN PATENT DOCUMENTS

EP    2233971 A1 *  9/2010 ................ G02F 1/29

* cited by examiner

*Primary Examiner* — Daniel Petkovsek
(74) *Attorney, Agent, or Firm* — CKC & Partners Co., Ltd.

(57) ABSTRACT

A second-harmonic generation nonlinear frequency converter includes a nonlinear optical crystal. The nonlinear optical crystal includes a plurality of sections. The sections connect to each other in sequence, and each section has a phase different from others. Each of the phases includes a positive domain and a negative domain. Each of the sections includes a plurality of quasi-phase-matching structures. The quasi-phase-matching structures connect to each other in sequence and have the same phase in one section.

9 Claims, 3 Drawing Sheets

SECOND-HARMONIC GENERATION NONLINER FRENQUENCY CONVERTER

RELATED APPLICATIONS

This application claims priority to Taiwan Application Serial Number 100103915, filed Feb. 1, 2011, which is herein incorporated by reference.

BACKGROUND

1. Field of Invention

The embodiment of the present invention relates generally to a converter and, more particularly, to a second-harmonic generation nonlinear frequency converter.

2. Description of Related Art

Recent years, demands for more convenient, robust and economical goods continue to rise with the advancement and progress of industry and social-economic. As such, products with more economic values are being developed to meet these and other needs.

In the mini-laser projection technology developed by CORININ and Microvision, the green laser is a wave-guide type and an x-cut PPMgLN with a length of 12 mm. In view of its technical indicator, a 10 ns, 1060 nm DBR-LD is used as a pump of the microminiaturization module to provide a narrow-band fundamental wave source (Δλ=0.16 nm) for second-harmonic conversion.

In this pump structure, the operation temperature of the PPMgLN is strictly limited to 25±1° C. so that three groups of temperature control devices are provided to keep the temperature of the 1060 nm laser source and the optical lens in a constant value. The consumption of the power source of the laser module and the stability of the system are the main concerns for the latter. The solution to the foregoing problem is to remove the limitation of the operation temperature and the temperature environment of the pump of the PPMgLN green light second-harmonic crystal.

One of the solutions is the limitation of the length of the crystal, PPMgLN having the quasi-phase-matching structure is adopted, and the product value of the green light conversion temperature-crystal length of the PPMgLN is T·L=2.1° C.-cm. The crystal length needs to be limited to 0.5 mm to make the PPMgLN crystal have a 40° C. operation temperature bandwidth.

However, the one-way transmission conversion efficiency of the second-harmonic crystal is low when operating with short length crystal. The problem of low conversion efficiency can be solved by using the optical cavity and adopting a 1064 nm infrared light source with short pulse in the optical cavity to increase the second-harmonic conversion efficiency. Additional optical components are needed in the foregoing solution such as a space holographic grating VBG to limit the 808 nm pump source bandwidth and increase the generation efficiency of the 1064 nm laser of the Nd:VYO4. Because the optical cavity is needed, the cost enhances relatively.

In view of the above, the existing apparatus still has obvious inconvenience and defects and needs further improvement. In order to solve the above problems, those skilled in the art are trying hard to find a solution, but no applicable method is put forward. Therefore, it is an important subject and also a purpose in need of improvement that how to improve the low bandwidth of the operation temperature of the nonlinear optical crystal and keep the conversion efficiency of the nonlinear optical crystal without increasing of the cost.

SUMMARY

A second-harmonic generation nonlinear frequency converter is provided so as to improve the low bandwidth of the operation temperature of the nonlinear optical crystal and keep the conversion efficiency of the nonlinear optical crystal without increasing of the cost.

Thus, one aspect of the embodiment of the present invention is to provide a second-harmonic generation nonlinear frequency converter. The second-harmonic generation nonlinear frequency converter comprises a nonlinear optical crystal. The nonlinear optical crystal comprises a plurality of sections. The sections are connected to each other sequentially and each of the sections respectively has a period which is different from each other, and each of the periods comprises a positive domain and a negative domain. Each of the sections comprises a plurality of quasi-phase-matching structures, wherein the quasi-phase-matching structures in the same section are connected to each other sequentially and have the same period.

In one embodiment of the present invention, the quasi-phase-matching structures are 1D-periodically poled quasi-phase-matching structures, 1D-aperiodically poled quasi-phase-matching structures, 2D-periodically poled quasi-phase-matching structures, or 2D-aperiodically poled quasi-phase-matching structures.

In another embodiment of the present invention, the duty cycle of the positive domain in one of the sections keeps a constant value.

In yet another embodiment of the present invention, the duty cycle of the positive domain in another one of the sections has a mathematics distribution function which is symmetrical to the space for the frequency converter.

In still another embodiment of the present invention, the mathematics distribution function is selected from the group consisting of a Gaussian function, a Lorentzian function, a sine function, a sin c(x), and a tan h(x).

In yet another embodiment of the present invention, the nonlinear optical crystal satisfies the following formula:

$$|T_i-T_f|=R \times \Delta T, 1 \leq R \leq 10,$$

wherein the Ti is the central temperature of the quasi-phase-matching structures of the section in one of the terminals of the nonlinear optical crystal, Tf is the central temperature of the quasi-phase-matching structures of the section in the other terminal of the nonlinear optical crystal, R is a proportionality constant, Δ T is the central temperature range of the quasi-phase-matching structures.

In still another embodiment of the present invention, the length of each of the sections is not longer than 5 cm, and the length of the nonlinear optical crystal is not longer than 50 cm.

In yet another embodiment of the present invention, the nonlinear optical crystal is a periodically poled lithium niobate, a periodically poled lithium tantalite, or a periodically poled potassium titanyl phosphate.

In still another embodiment of the present invention, the periodically poled lithium niobate is a Zn-doped periodically poled lithium niobate or a Mg-doped periodically poled lithium niobate.

In yet another embodiment of the present invention, the periodically poled lithium tantalate is a Zn-doped periodically poled lithium tantalate or a Mg-doped periodically poled lithium tantalate.

In summary, the embodiments of the present invention provide the second-harmonic generation nonlinear frequency converter. The second-harmonic generation nonlinear frequency converter is operable to improve the low bandwidth of the operation temperature of the nonlinear optical crystal and keep the conversion efficiency of the nonlinear optical crystal without increasing of the cost.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
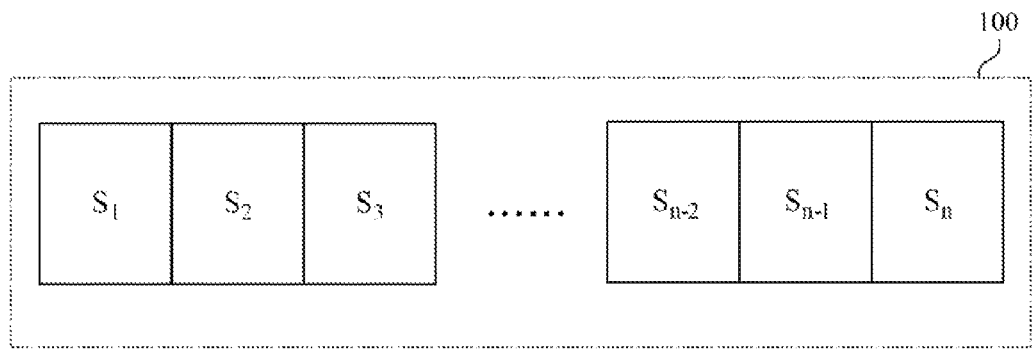
FIG. 1 schematically shows a diagram of a second-harmonic generation nonlinear frequency converter according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

FIG. 1 schematically shows a diagram of a second-harmonic generation nonlinear frequency converter according to one embodiment of the present invention.

As shown in FIG. 1, the second-harmonic generation nonlinear frequency converter comprises a nonlinear optical crystal 100. The nonlinear optical crystal 100 comprises a plurality of sections $S_1 \sim S_n$. The sections $S_1 \sim S_n$ are connected to each other sequentially, and each of the sections respectively has a period which is different from each other, wherein each of the periods comprises a positive domain and a negative domain.

In one embodiment of the present invention, the duty cycle of the positive domain in one of the sections $S_1 \sim S_n$ keeps a constant value. For example, the duty cycle of the positive domain in section $S_1$ may be 25.7%.

In another embodiment of the present invention, the duty cycle of the positive domain in another one of the sections $S_1 \sim S_n$ has a mathematics distribution function which is symmetrical to the space for the frequency converter.

Specifically, the mathematics distribution function is selected from the group consisting of a Gaussian function, a Lorentzian function, a sine function, a sin c(x), and a tan h function.

For example, the duty cycles of the positive domains in sections $S_2 \sim S_{18}$ are sequentially 27.2%, 28.7%, 30.2%, 31.6%, 33.1%, 34.5%, 36%, 35.9%, 35.9%, 35.8%, 34.3%, 32.7%, 31.2%, 29.7%, 28.1%, 26.6%, and 25.1%.

Figure 2:
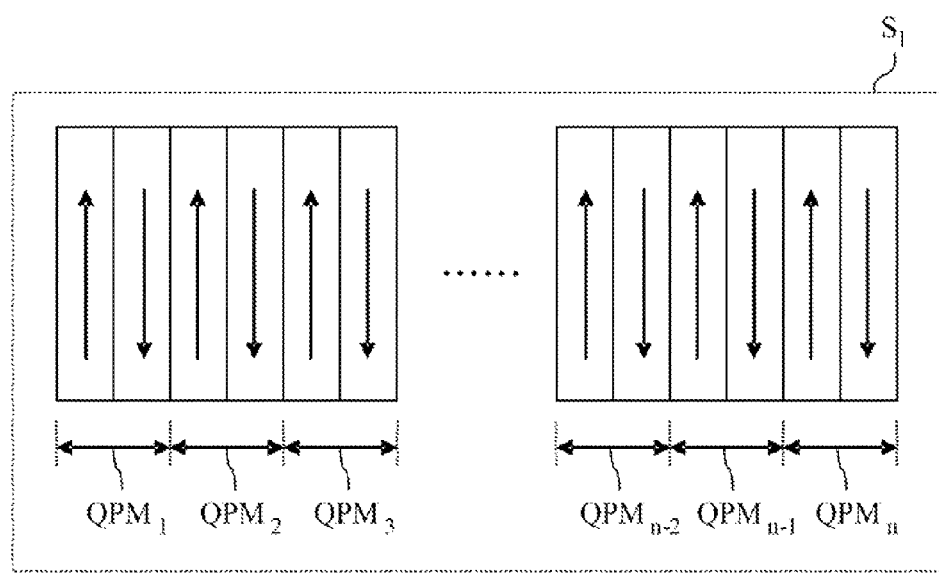
FIG. 2 schematically shows a diagram of a first section of a nonlinear optical crystal according to one embodiment of the present invention.

FIG. 2 schematically shows a diagram of a first section $S_1$ of a nonlinear optical crystal 100 according to one embodiment of the present invention.

Reference is now made to FIG. 2, each of the sections $S_1 \sim S_n$ (for example, the section $S_1$) comprises a plurality of quasi-phase-matching structures $QPM_1 \sim QPM_n$, and the quasi-phase-matching structures $QPM_1 \sim QPM_n$ in the same section $S_1$ are connected to each other sequentially and have the same period.

On the other hand, the sections $S_1 \sim S_n$ are connected to each other sequentially and each of the sections $S_1 \sim S_n$ respectively has a period which is different from each other. For example, the periods of the quasi-phase-matching structures $QPM_1 \sim QPM_n$ in sections $S_2 \sim S_{18}$ are sequentially 6.59 µm, 6.6 µm, 6.61 µm, 6.62 Ξm, 6.63 µm, 6.64 µm, 6.65 µm, 6.66 µm, 6.67 µm, 6.68 µm, 6.69 µm, 6.7 µm, 6.71 µm, 6.72 µm, 6.73 µm, 6.74 µm, 6.75 µm, and 6.76 µm.

In on embodiment of the present invention, each of the quasi-phase-matching structures $QPM_1 \sim QPM_n$ is a 1D-periodically poled quasi-phase-matching structure, a 1D-aperiodically poled quasi-phase-matching structure, a 2D-periodically poled quasi-phase-matching structure, or a 2D-aperiodically poled quasi-phase-matching structure.

According to the principle and the spirit of the present invention, the nonlinear optical crystal 100 satisfies the following formula:

$$|T_i - T_f| = R \times \Delta T, 1 \leq R \leq 10,$$

wherein the Ti is the central temperature of the quasi-phase-matching structures $QPM_1 \sim QPM_n$ of the section (for example, section $S_1$) in one of the terminals of the nonlinear optical crystal 100, Tf is the central temperature of the quasi-phase-matching structures $QPM_1 \sim QPM_n$ of the section (for example, section $S_n$) in the other terminal of the nonlinear optical crystal 100, R is a proportionality constant, $\Delta T$ is the central temperature range of the quasi-phase-matching structures $QPM_1 \sim QPM_n$.

For example, the quasi-phase-matching structures $QPM_1 \sim QPM_n$ of each of the sections $S_1 \sim S_{18}$ have the same central temperature, for instance, the quasi-phase-matching structures $QPM_1$~$QPM_n$ of the $S_1$ have the same central temperature.

However, the central temperature of each of the sections $S_1$~$S_{18}$ is different from each other, for example, the central temperatures of the quasi-phase-matching structures $QPM_1$~$QPM_n$ in sections $S_1$~$S_{18}$ are sequentially 155° C., 149° C., 143° C., 137° C., 131° C., 124.5° C., 118.5° C., 112° C., 105.5° C., 99° C., 92.5° C., 86° C., 79° C., 72.5° C., 65.5° C., 58° C., 51° C., and 43.5° C.

Furthermore, the length of each of the sections $S_1$~$S_n$ is not longer than 5 cm, and the length of the nonlinear optical crystal 100 is not longer than 50 cm.

In one embodiment of the present invention, the nonlinear optical crystal 100 is a periodically poled lithium niobate, a periodically poled lithium tantalite, or a periodically poled potassium titanyl phosphate (KTiOPO4 (KTP)).

Specifically, the periodically poled lithium niobate is a Zn-doped periodically poled lithium niobate, or a Mg-doped periodically poled lithium niobate.

Moreover, the periodically poled lithium tantalate is a Zn-doped periodically poled lithium tantalite, or a Mg-doped periodically poled lithium tantalate.

Figure 3:
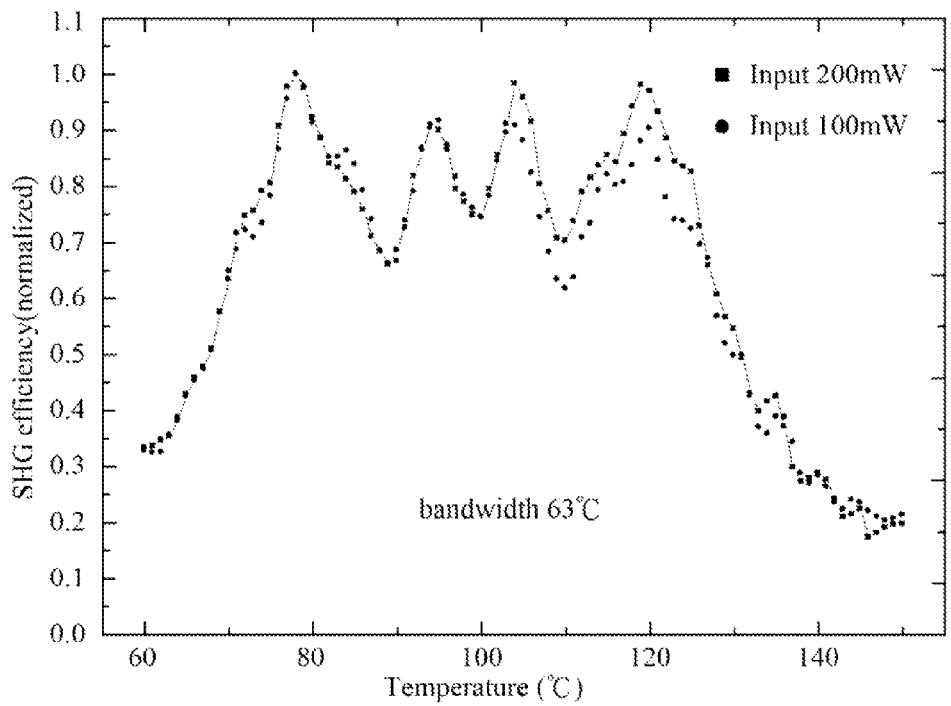
FIG. 3 schematically shows a diagram of an operation temperature and a conversion efficiency according to the second-harmonic generation nonlinear frequency converter as shown in FIG. 1.

Reference is now made to FIG. 3 which schematically shows a diagram of an operation temperature and a conversion efficiency according to the second-harmonic generation nonlinear frequency converter as shown in FIG. 1.

As shown in FIG. 3, the second-harmonic generation nonlinear frequency converter of the embodiment of the present uses a Nd:YVO4 infrared light fundamental wave with 1064 nm (5 ns pulse width) as its pump, so that the temperature bandwidth of the green light (532 nm) laser (second-harmonic wave laser) can be extended to 63 degree Celsius.

Figure 4:
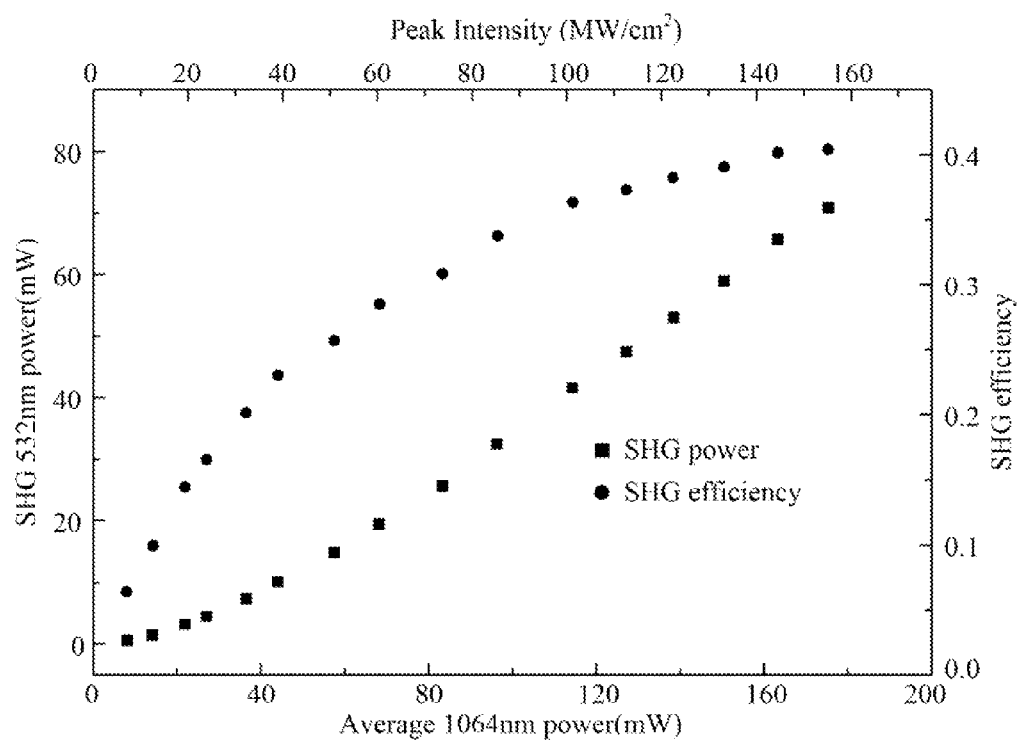
FIG. 4 schematically shows a diagram of a laser conversion efficiency according to the second-harmonic generation nonlinear frequency converter as shown in FIG. 1.

FIG. 4 schematically shows a diagram of a laser conversion efficiency according to the second-harmonic generation nonlinear frequency converter as shown in FIG. 1.

As shown in FIG. 4, the second-harmonic generation nonlinear frequency converter of the embodiment of the present uses a Nd:YVO4 infrared light fundamental wave with 1064 nm (5 ns pulse width) as its pump, the conversion efficiency saturation value of the green light laser is about 40.2%.

Figure 5:
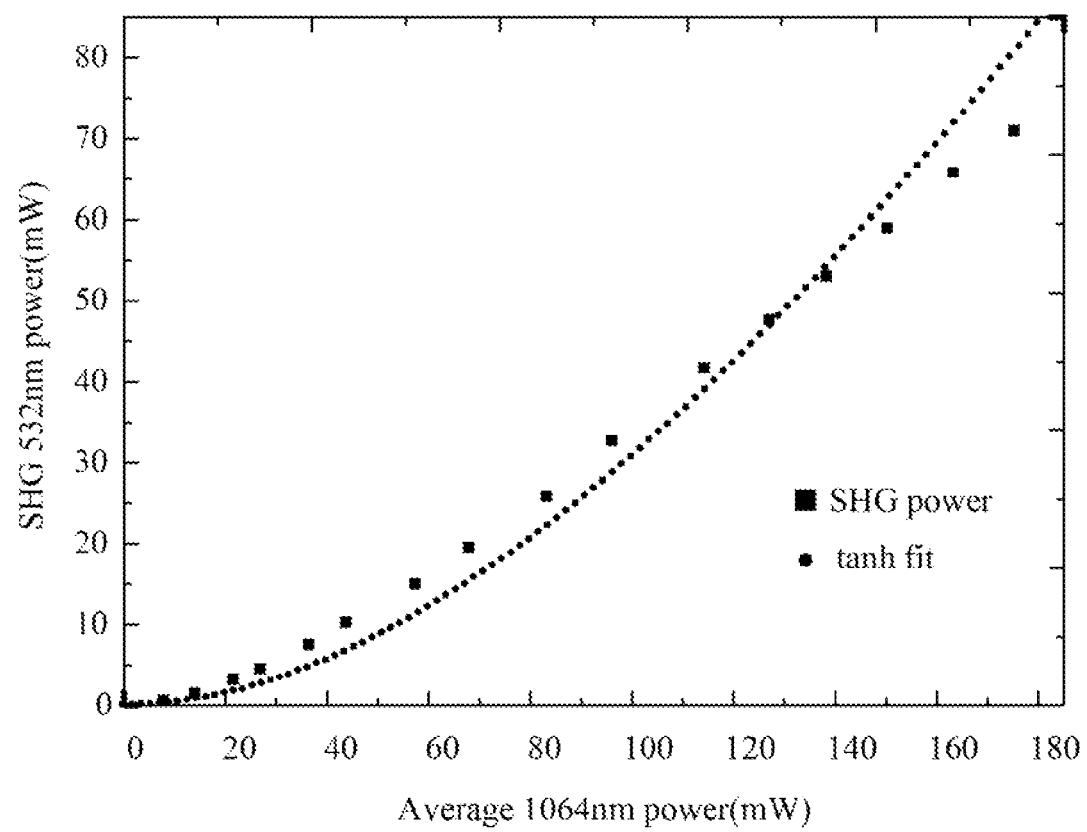
FIG. 5 schematically shows a diagram of a laser conversion efficiency according to the second-harmonic generation nonlinear frequency converter as shown in FIG. 1.

FIG. 5 schematically shows a diagram of a laser conversion efficiency according to the second-harmonic generation nonlinear frequency converter as shown in FIG. 1.

As shown in FIG. 5, the second-harmonic generation nonlinear frequency converter of the embodiment of the present uses a Nd:YVO4 infrared light fundamental wave with 1064 nm (5 ns pulse width) as its pump, the second-harmonic conversion efficiency curve thereof is similar to tan h(x) curve. The fitting formula of the tan h(x) is as following:

$$\eta \equiv \frac{P_{2\omega}(z)}{P_\omega(0)} = \tanh^2\left[(\eta_0 P_\omega(0) z^2)^{1/2}\right] = \tanh^2(\Gamma z)|$$

wherein P2ω(Z) is the second-harmonic power of the nonlinear optical crystal length Z, Pω(0) is the fundamental wave power of the incident nonlinear optical crystal length, Z is the length of the nonlinear optical crystal.

In view of the foregoing embodiments of the present invention, many advantages of the present invention are now apparent. The embodiment of the present invention provides a second-harmonic generation nonlinear frequency converter. The second-harmonic generation nonlinear frequency converter is operable to improve the low bandwidth of the operation temperature of the nonlinear optical crystal and keep the conversion efficiency of the nonlinear optical crystal without increasing of the cost.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A second-harmonic generation nonlinear frequency converter, comprising:
a nonlinear optical crystal, comprising:
a plurality of sections, wherein the sections are connected to each other sequentially and each of the sections respectively has a period which is different from each other, and each of the periods comprises a positive domain and a negative domain, each of the sections comprising:
a plurality of quasi-phase-matching structures, wherein the quasi-phase-matching structures in the same section are connected to each other sequentially and have the same period;
wherein the nonlinear optical crystal satisfies the following formula:

$|T_i - T_f| = R \times \Delta T, 1 \leq R \leq 10,$ wherein the Ti is the central temperature of the quasi-phase-matching structures of the section in one of the terminals of the nonlinear optical crystal, Tf is the central temperature of the quasi-phase-matching structures of the section in the other terminal of the nonlinear optical crystal, R is a proportionality constant, ΔT is the central temperature range of the quasi-phase-matching structures.

2. The second-harmonic generation nonlinear frequency converter according to claim 1, wherein the quasi-phase-matching structures are 1D-periodically poled quasi-phase-matching structures, 1D-aperiodically poled quasi-phase-matching structures, 2D-periodically poled quasi-phase-matching structures, or 2D-aperiodically poled quasi-phase-matching structures.

3. The second-harmonic generation nonlinear frequency converter according to claim 1, wherein the duty cycle of the positive domain in one of the sections keeps a constant value.

4. The second-harmonic generation nonlinear frequency converter according to claim 3, wherein the duty cycle of the positive domain in another one of the sections has a mathematics distribution function which is symmetrical to the space for the frequency converter.

5. The second-harmonic generation nonlinear frequency converter according to claim 4, wherein the mathematics distribution function is selected from the group consisting of a Gaussian function, a Lorentzian function, a sine function, a sin c(x), and a tan h(x).

6. The second-harmonic generation nonlinear frequency converter according to claim 1, wherein the length of each of the sections is not longer than 5 cm, and the length of the nonlinear optical crystal is not longer than 50 cm.

7. The second-harmonic generation nonlinear frequency converter according to claim 1, wherein the nonlinear optical crystal is a periodically poled lithium niobate, a periodically poled lithium tantalite, or a periodically poled potassium titanyl phosphate.

8. The second-harmonic generation nonlinear frequency converter according to claim 7, wherein the periodically poled lithium niobate is a Zn-doped periodically poled lithium niobate or a Mg-doped periodically poled lithium niobate.

9. The second-harmonic generation nonlinear frequency converter according to claim 7, wherein the periodically poled lithium tantalate is a Zn-doped periodically poled lithium tantalate or a Mg-doped periodically poled lithium tantalate.

* * * * *